Figure 1:
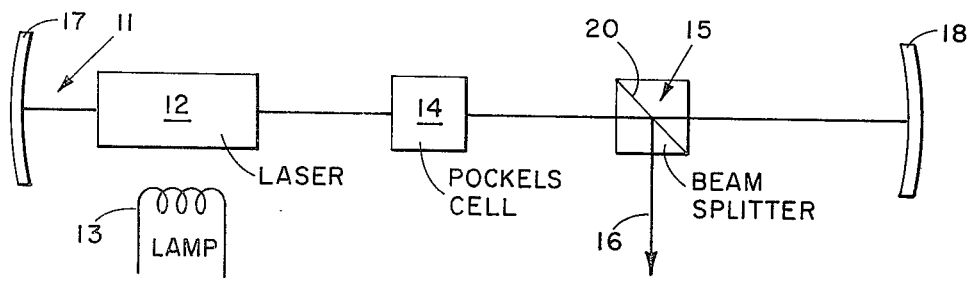

United States Patent [19]
White

[11] 3,928,818
[45] Dec. 23, 1975

[54] METHOD OF REDUCING LIGHT LEAKAGE IN LASERS

[75] Inventor: Matthew B. White, Cohasset, Mass.

[73] Assignee: The United States of America as represented by the Secretary of the Navy, Washington, D.C.

[22] Filed: Oct. 17, 1974

[21] Appl. No.: 516,241

[52] U.S. Cl. .................. 331/94.5 T; 331/94.5 Q
[51] Int. Cl.² .......................................... H01S 3/11
[58] Field of Search ........... 331/94.5; 350/150, 151, 350/157

[56] References Cited
UNITED STATES PATENTS

| | | |
|---|---|---|
| 3,564,454 | 2/1971 | Hook et al. ................ 331/94.5 C |
| 3,740,663 | 6/1973 | Andringa ................... 331/94.5 Q |

Primary Examiner—William L. Sikes
Attorney, Agent, or Firm—R. S. Sciascia; C. E. Vautrain, Jr.

[57] ABSTRACT

A Q switched and cavity dumped laser system is provided in which a 45° Faraday rotator and an auxiliary cavity mirror are disposed in the beam path to compensate for the polarization change caused by thermally stressed laser rods.

6 Claims, 2 Drawing Figures

METHOD OF REDUCING LIGHT LEAKAGE IN LASERS

This invention concerns laser systems and, more particularly, a method of and means for reducing light leakage in Q switched and cavity dumped laser systems.

Techniques used to switch the Q of the resonant chamber of Q switched laser systems include various electro-optical arrangements. These arrangements commonly employ a polarization selector and polarization switch, such as a Pockel's cell, in the resonant chamber so that while unpolarized or randomly polarized light is radiated by the laser crystal only light of a particular linear polarization resonates within the chamber and passes through the laser crystal whereas light that is linearly polarized in a direction that is orthogonal to the first linear polarization, does not so resonate. Such a system permits significant leakage of light because of the thermally induced anisotropies in the laser rod that are introduced during the optical pumping pulse. These anisotropies occur because the thermally stressed laser rod acts as a birefringent element which, in general, causes impinging, linearly polarized laser radiation to assume an arbitrary state of elliptical polarization after a single pass. In order to reduce such birefringent effects, cooling systems have been employed to control the temperature within the laser rod. It is desirable to eliminate the light losses resulting from such elliptical polarization by means other than the bulky and only partically effective laser rod cooling systems.

Accordingly, it is an object of the present invention to eliminate or substantially reduce the effect of anisotropies in a laser rod which depolarize the intracavity beam and cause losses in the system.

Another object of the invention is to reduce or eliminate losses in an optical cavity by means which are insensitive to the birefringent characteristics of a heated laser rod.

Figure 2:
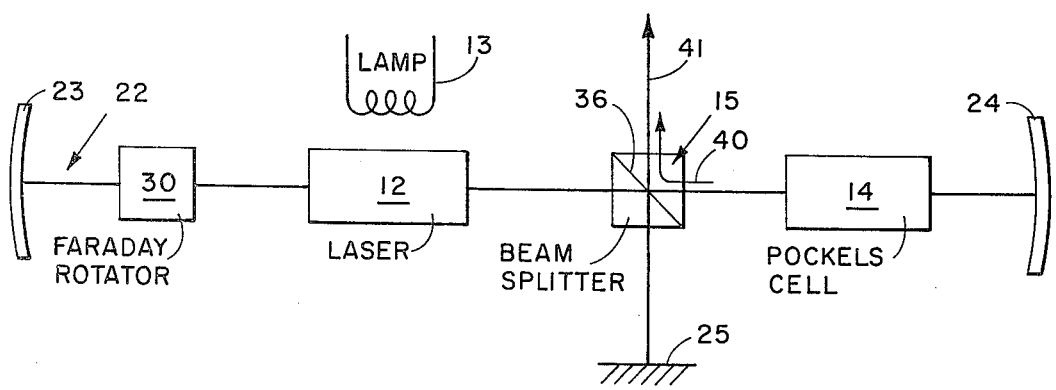

Other objects, advantages and novel features of the invention will become apparent from the following detailed description thereof when considered in conjunction with the accompanying drawings in which like numerals represent like parts throughout and wherein:

FIG. 1 is a schematic diagram of a conventional form of a Q switched or cavity dumped laser system; and FIG. 2 is a schematic diagram of the laser system of FIG. 1 including the improvements of the present invention.

In accordance with the present invention, the light losses introduced into Q switched or cavity dumped laser systems due to polarization changes caused by a thermally stressed rod are corrected by returning depolarized light to its original state of polarization. This is accomplished by a polarization reconstitution process effected through a Faraday rotator and an auxiliary mirror appropriately positioned in the laser cavity.

Referring to the drawing, FIG. 1 shows a conventional arrangement of a laser cavity 11 for use in Q switching or cavity dumping laser systems. In the cavity are positioned a laser rod 12 and a lamp indicated by filament 13 for energizing the laser rod, a Pockels cell 14 for controllably altering the state of polarization of the intracavity radiation field and a polarization sensitive beam splitter 15 for diverting radiation which possesses a particular state of linear polarization out of the cavity as indicated by arrow 16. When such an arrangement is used in the cavity dump mode, the laser rod is optically pumped by pulsating light from filament 13, and the Pockels cell is maintained inoperative until a desired level of energy has built up in the cavity, which is defined by mirrors 17 and 18, whereupon the Pockels cell is actuated. When operative, the Pockels cell has the effect of rotating the plane of the radiant energy 90° so that it is deflected out of the cavity by a diagonal interface 20 in beam splitter 15. Such a system, however, permits radiant energy losses because of, among other causes, the heating of laser rod 12 by filament 13, which has the effect of making the laser rod a birefringement element so that it alters the polarization of light passing through it and, in particular, causes linear polarization light to assume an arbitrary state of elliptical polarization. This birefringent effect in general causes a considerable amount of leakage of radiant energy out of the cavity while the Pockels cell is in the inoperative condition since, in general, the resulting elliptically polarized radiation will have a linearly polarized component that is discharged from the cavity.

FIG. 2 is a schematic diagram of a laser cavity 22 which is defined by reflecting surfaces 23, 24, and 25 and includes some of the elements of the cavity of FIG. 1 plus additional elements for preventing the leakage which the cavity of FIG. 1 permits. In FIG. 2, laser rod 12, filament 13, Pockels cell 14 and beam splitter 15 are the common elements, while a Faraday rotator 30 inserted between laser 12 and mirror 23 operates to reconstitute the polarization of radiation which passes back and forth through it and heated laser rod 12.

To understand the operation of the invention, consider an initial radiation field $\vec{E}_{L,12-15}$ that is polarized along unit vector $\hat{i}$ in the plane of FIG. 2 with amplitude A and is propagating in the left hand (L) direction toward laser rod 12 in the region between laser rod and beam splitter 15 (in the 12–15 region). Mathematically this radiation field can be represented by the expression:

$$\vec{E}_{L,12-15} = \cos\omega t \hat{i} \qquad (1)$$

where $\vec{E}$ is the optical frequency electric field and $\omega$ is the angular optical frequency. In general this field will have components both parallel and perpendicular to the principal plane of anisotropic laser rod 12. Denoting unit vectors in and normal to the principal plane by $\hat{i}'$ and $\hat{j}'$, respectively, $\vec{E}_{L,12-15}$ of equation (1) can be rewritten in the form:

$$\vec{E}_{L,12-15} = A\cos\theta\cos\omega t\hat{i}' - A\sin\theta\cos\omega t\hat{j}' \qquad (2)$$

where $\theta$ is the angle between initial polarization direction $\hat{i}$ and $\hat{i}'$. The specific value of $\theta$ therefore depends upon the nature of the anisotropic laser rod 12. Upon passing through the laser rod, phase shifts $\phi_i'$ and $\phi_j'$ are introduced for polarization components in and perpendicular to the laser rod principal plane. Hence, in the 12–30 region the left directed radiation field is given by:

$$\vec{E}_{L,12-30} = A\cos\theta\cos(\omega t + \phi_i')\hat{i}' - A\sin\theta\cos(\omega t + \phi_j')\hat{j}' \qquad (3)$$

The effect of passing through 45° Faraday rotator 30, reflecting off cavity mirror 23, and passing back through Faraday rotator 30 is to rotate all linearly polarized components of the radiation field through 90°. Hence, the right propagating radiation field in the 12–30 region is given by:

$$\vec{E}_{R,12-30} = - A\sin\theta\cos(\omega t + \phi_i')\hat{i}' - A\cos\theta\cos(\omega t + \phi_j')\hat{j}' \qquad (4)$$

The effect of passing back through anisotropic laser rod 12 is to introduce the same polarization dependent phase shifts as were introduced during the first pass.

Hence, the right propagating radiation field in the 12–15 region is given by:

$$\vec{E}_{R,12\text{-}15} = A \cos(\omega t + \phi_J + \phi_{I'} + \pi)(\sin\theta \hat{i}' + \cos\theta \hat{j}') \quad (5)$$

When $\hat{i}'$ and $\hat{j}'$ are expressed in terms of unit vectors $\hat{i}$ and $\hat{j}$ which lie along the perpendicular to the original linear polarization direction, equation (5) reduces to:

$$\vec{E}_{R,12\text{-}15} = A \cos(\omega t + \phi_J + \phi_{I'} + \pi)\hat{j} \quad (6)$$

Hence, the right propagating field in the 12–15 region is linearly polarized at 90° to the initial left propagating field no matter what the nature of the anisotropic rod. The only effect of the rod birefringence is to introduce an extra phase shift in the linearly polarized beam. Assuming that polarization sensitive beam splitter 15 is arranged to transmit light polarized in the $\hat{j}$ direction and Pockel cell 14 is turned off so that it does not affect the polarization of light passing through it, $\vec{E}_{R,12\text{-}15}$ passes unchanged through these components, is reflected by cavity mirror 24, again passes unchanged through elements 15 and 14, and makes another double pass through elements 12 and 30 so that its linear polarization direction has been rotated by (90°) back to the original $\hat{i}$ direction when it re-enters the 12–15 region from the left. The radiation field is, therefore, reflected from the diagonal interface 36 of beam splitter 15 and is subsequently redirected into its original propagation direction after reflection from cavity mirror 25. Hence, after a double pass between cavity mirrors 23 and 24 and a single pass between beam splitter 15 and cavity mirror 25, the radiation field returns to its original starting position with its original state of linear polarization. This is true no matter what the optical characteristics of anisotropic laser rod 12.

Alternatively, if Pockels cell 14 is switched on so that after a double pass the state of polarization of radiation initially impinging from the left is rotated by 90°, all radiation striking beam splitter 15 from the right is extracted by reflection from diagonal interface 36. Hence all radiation is extracted from the cavity in a time equal to two round trip transit times.

The above description of operation holds for left propagating radiation which starts in the 12–15 region with arbitrary phase and which is initially linearly polarized either in or perpendicular to the plane of FIG. 1. Since any arbitrary state of elliptical polarized light can be thought of as made up of two orthogonally, linearly polarized components in the $\hat{i}$ and $\hat{j}$ directions with arbitrary phases, and since double transits through regions 15–25 and 15–24 in effect only add additional phase factors to those components, it follows that the invention will function properly for an arbitrary polarized radiation field propagating in either direction in the 12–15 region. This system is lossless insofar as radiation leakage is concerned but is, of course, subject to the normal losses associated with the absorption and scattering of lasing light impinging upon and passing through the elements in the cavity.

The present invention, thus, provides a lossless solution to the problems of light leakage in laser systems caused by anisotropies resulting from optical pumping by reconstituting the depolarized light through the insertion of a Faraday rotator and an auxiliary mirror in the laser cavity. The lossless solution obviates the need for elaborate laser rod cooling equipment and conserves laser energy by allowing elliptically polarized radiation to participate in laser action instead of discarding such radiation. This form of solution is applicable to all laser systems where polarization degrading action occurs because of the optical pumping process, e.g. in optical communication, ranging and guidance systems where maximum output is desired and essential.

What is claimed is:

1. A system for use in a laser cavity for compensating for the polarization changes in Q switched and cavity dumped lasers caused by anisotropies resulting from optical pumping or other causes comprising:
   polarization sensitive means in the laser cavity and reflective means associated with said polarization sensitive means for forming an auxiliary laser cavity;
   a laser rod in said auxiliary cavity and means adjacent said rod for optically pumping the laser rod;
   magneto-optical rotation means intermediate said laser rod and the adjacent end of said laser cavity for incrementally rotating the plane of polarization of depolarized radiation until it returns to the original state of polarization; and
   means positioned intermediate said polarization sensitive means and the other end of said laser cavity for controllably altering the state of polarization of the intracavity radiation so that the radiation may be deflected out of the laser cavity by said polarization sensitive means.

2. The system of claim 1 wherein said polarization sensitive means is a beam splitter which allows linearly polarized radiation to pass through and includes a diagonally disposed double-faced reflector for deflecting in opposite directions mutually orthogonal linearly polarized components of nonlinearly polarized radiation incident on its reflecting surfaces, the other end of said cavity returning radiation along its line of incidence to the adjacent surface of said double-faced reflector so that radiation polarized in one direction passes back into the auxiliary cavity while radiation polarized in an orthogonal direction is deflected from the cavity and constitutes the laser output.

3. The system of claim 2 wherein said magneto-optical rotating means rotates the principal axes of emergent elliptical polarized radiation 45° so that after a double round trip pass through said auxiliary cavity linearly polarized radiation that had been depolarized by the laser rod will be returned to its original state of linear polarization and may then be extracted from said laser cavity along with the original linearly polarized radiation.

4. A method of compensating for the polarization changes in Q switched and cavity dumped laser systems caused by thermal stresses induced in the laser rods therein comprising:
   partitioning the laser cavity such that radiation which is not linearly polarized is present in only one portion of the cavity;
   utilizing the birefringent properties of the laser rod to linearly polarize radiation that is depolarized by said birefringent properties within said one portion of the cavity; and
   combining the formerly depolarized radiation in said one portion of the cavity with linearly polarized radiation from the other portion of said cavity so that radiation losses caused by optical pumping are substantially eliminated.

5. The method of claim 4 wherein the substantially elliptically polarized radiation produced by passing linearly polarized radiation through the laser rod is linearly polarized by rotating its major axes through 90° without changing the eccentricity of the polarization ellipse prior to passing it back through the laser rod.

6. The method of claim 5 wherein the nonlinearly polarized radiation is linearly polarized by successive rotation of the plane of its polarization and is combined with the initially linearly polarized radiation in a self-compensating manner without changing the eccentricities of the polarization ellipses.

* * * * *